US010435061B2

(12) United States Patent
Taniguchi et al.

(10) Patent No.: US 10,435,061 B2
(45) Date of Patent: Oct. 8, 2019

(54) ACTUATOR MOTOR WITH HELICAL WAVE WASHER BETWEEN BEARING AND CASING

(71) Applicant: DENSO CORPORATION, Kariya, Aichi-pref. (JP)

(72) Inventors: Makoto Taniguchi, Kariya (JP); Koji Isogai, Kariya (JP)

(73) Assignee: DENSO CORPORATION, Kariya (JP)

( * ) Notice: Subject to any disclaimer, the term of this patent is extended or adjusted under 35 U.S.C. 154(b) by 756 days.

(21) Appl. No.: 14/976,753

(22) Filed: Dec. 21, 2015

(65) Prior Publication Data
US 2016/0272238 A1  Sep. 22, 2016

(30) Foreign Application Priority Data

Mar. 16, 2015 (JP) ................. 2015-051996

(51) Int. Cl.
| *H02K 7/08*  | (2006.01) |
| *B62D 5/04*  | (2006.01) |
| *H02K 5/173* | (2006.01) |
| *F16C 25/08* | (2006.01) |
| *H02K 7/06*  | (2006.01) |
| *F16C 19/54* | (2006.01) |

(52) U.S. Cl.
CPC .......... *B62D 5/0421* (2013.01); *F16C 25/083* (2013.01); *H02K 5/1732* (2013.01); *H02K 7/083* (2013.01); *F16C 19/54* (2013.01); *F16C 2380/27* (2013.01); *H02K 7/06* (2013.01)

(58) Field of Classification Search
CPC ........ F16C 25/083; F16C 25/08; F16C 19/54; H02K 5/1732; H02K 7/083; H02K 7/06; B62D 5/0421

USPC .................... 310/90, 91, 90.5, 425
See application file for complete search history.

(56) References Cited

U.S. PATENT DOCUMENTS

| 2,986,436 A  | * | 5/1961 | Shiotsu ................... F16C 19/54 |
|              |   |        | 384/611 |
| 4,752,178 A  | * | 6/1988 | Greenhill ............... F16B 21/18 |
|              |   |        | 403/326 |
| 5,558,393 A  |   | 9/1996 | Hawkins et al. |
| 6,388,351 B1 | * | 5/2002 | Fisher .................. H02K 5/1732 |
|              |   |        | 310/90 |
| 7,793,923 B2 | * | 9/2010 | Suzuki .................... F16F 1/328 |
|              |   |        | 267/162 |

(Continued)

FOREIGN PATENT DOCUMENTS

| JP | H1-210607 A    | 8/1989 |
| JP | 2011-035984 A  | 2/2011 |
| JP | 2013-199181 A  | 10/2013 |

*Primary Examiner* — Julio C. Gonzalez
*Assistant Examiner* — Maged M Almawri (57) ABSTRACT

A case is formed of aluminum. A rotation axis has one end affixed with an input rotor element and is rotational with a rotor. A first bearing is equipped to the case and is located between the input rotor element and the rotor to rotationally support the rotation axis. A second bearing is equipped to the case and is located on an opposite side of the rotor from the first bearing to rotationally support the rotation axis. A multilayered helical wave washer is wound for three rounds or more in a spiral wave form and is located in an axial gap formed between the case and an outer ring of one of the first bearing and the second bearing to apply a spring load to the outer ring in the axial direction.

14 Claims, 4 Drawing Sheets

(56) References Cited

U.S. PATENT DOCUMENTS

| | | | |
|---|---|---|---|
| 8,490,285 B2* | 7/2013 | Knebel, III | F16F 1/043 |
| | | | 267/167 |
| 9,054,563 B2* | 6/2015 | Matsunaga | B62D 5/0403 |
| 9,429,179 B2* | 8/2016 | Tran | F16B 21/10 |
| 9,963,998 B2* | 5/2018 | Marsal | F01D 25/16 |
| 2003/0032521 A1* | 2/2003 | Boston | F16C 21/00 |
| | | | 475/331 |
| 2005/0103579 A1* | 5/2005 | Meernik | F16B 7/14 |
| | | | 188/67 |
| 2005/0168085 A1 | 8/2005 | Ihata et al. | |
| 2013/0140964 A1 | 6/2013 | Matsunaga et al. | |
| 2014/0001900 A1 | 1/2014 | Chang | |
| 2014/0339966 A1 | 11/2014 | Tomizawa et al. | |
| 2015/0176670 A1* | 6/2015 | Laszlo | F16F 1/328 |
| | | | 267/165 |

* cited by examiner

ACTUATOR MOTOR WITH HELICAL WAVE WASHER BETWEEN BEARING AND CASING

CROSS REFERENCE TO RELATED APPLICATION

This application is based on reference Japanese Patent Application No. 2015-051996 filed on Mar. 16, 2015, the disclosure of which is incorporated herein by reference.

TECHNICAL FIELD

The present disclosure relates to an actuator motor for a steering device of a vehicle.

BACKGROUND

In recent years, an electric power-steering device is employed in a steering device of a vehicle. An electric power-steering device is equipped to a portion around a rack axis of the steering device. An electric power-steering device of this kind transmits an output power of an actuator motor to a rack axis by using a transmission mechanism, such as a belt transmission mechanism. The actuator motor frequently inverts its rotational direction in order to move the vehicle rightward and leftward according to an intention of a driver. The transmission mechanism may employ a helical toothed device in order to reduce uncomfortableness and to enhance a feeling of a steering operation. For example, a transmission mechanism may employ a helical toothed belt pulley and a belt, a helical toothed gear pair, and/or the like.

It is noted that, in a configuration employing a helical toothed pulley, a helical toothed belt, and/or the like, a counter force works on a rotation axis in an axial direction when an actuator motor is in operation. The direction of the counter force is inverted as the rotational direction of the actuator motor is inverted. Therefore, a bearing, which supports the rotation axis, is applied with an impact when the counter force is inverted in direction.

It is an object of the present disclosure to produce an actuator motor for an electric power-steering device enabling to reduce a stress caused in a bearing, which supports a rotation axis, without enlargement of the device in a radial direction.

SUMMARY

As described above, in a configuration employing a helical toothed pulley, a helical toothed belt, and/or the like, a counter force works on a rotation axis in an axial direction when an actuator motor is in operation. The direction of the counter force is inverted as the rotational direction of the actuator motor is inverted. Therefore, a bearing, which supports the rotation axis, is applied with an impact when the counter force is inverted in direction. The inventor investigated that the impact causes a stress in the bearing. In order to mitigate the stress caused in the bearing, the bearing may be enlarged in a radial direction. However, the enlargement of the bearing in the radial direction may entail enlargement of the actuator motor in the radial direction. This enlargement of the bearing and/or the actuator motor may not be desirable in consideration of mountability of the device to a vehicle.

In consideration of this, the bearing and a case may form a space therebetween in an axial direction, and a washer may be equipped in the space to absorb the impact thereby to mitigate a stress caused in a bearing, without changing in the size of the bearing. The washer maybe, for example, a multilayered helical wave washer disclosed in Patent Document 1.

(Patent Document 1)

Japanese Patent Publication No. 4306476

It is further noted that, Patent Document 1 supposes the multilayered helical wave washer to be employed in an alternator. A rotation axis of an alternator is rotational in one rotational direction constantly. The case of the alternator is formed of a ferrous material.

As described above, an electric power-steering device may employ a transmission mechanism including a helical toothed device with an actuator motor, which inverts its rotational direction frequently. In such an electric power-steering device, a space formed between a bearing and a case changes in the axial direction by a large quantity and at a higher frequency, compared with an alternator. The inventor discovered necessity of a spring, which has a smaller spring constant than a spring used in an alternator, in order to continue application of a desirable spring load to a bearing in the space, which changes largely in quantity in the axial direction. In particular, in a product including a case formed of aluminum, a gap between a bearing and the case may largely change in the radial direction due to change in temperature, compared with a case formed of a ferrous material. In consideration of this, such a product including the case formed of aluminum may require application of a still greater spring load to hold the bearing.

According to an aspect of the present disclosure, an actuator motor is for a steering device of a vehicle. The steering device includes a transmission mechanism configured to produce a change in a load in an axial direction. The actuator motor comprises a case formed of aluminum. The actuator motor further comprises a stator affixed to the case. The actuator motor further comprises a rotor configured to rotate according to a rotational magnetic field generated by the stator. The actuator motor further comprises a rotation axis having one end affixed with an input rotor element of the transmission mechanism. The rotation axis is configured to rotate with the rotor. The actuator motor further comprises a first bearing located between the input rotor element and the rotor. The first bearing is equipped to the case. The first bearing rotationally supports the rotation axis. The actuator motor further comprises a second bearing located on an opposite side of the rotor from the first bearing. The second bearing is equipped to the case. The second bearing rotationally supports the rotation axis. The actuator motor further comprises a multilayered helical wave washer wound for three rounds or more in a spiral wave form, the multilayered helical wave washer located in an axial gap formed between the case and an outer ring of one of the first bearing and the second bearing, the multilayered helical wave washer configured to apply a spring load to the outer ring in the axial direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described with reference to drawings.

(Embodiment)

Figure 1:
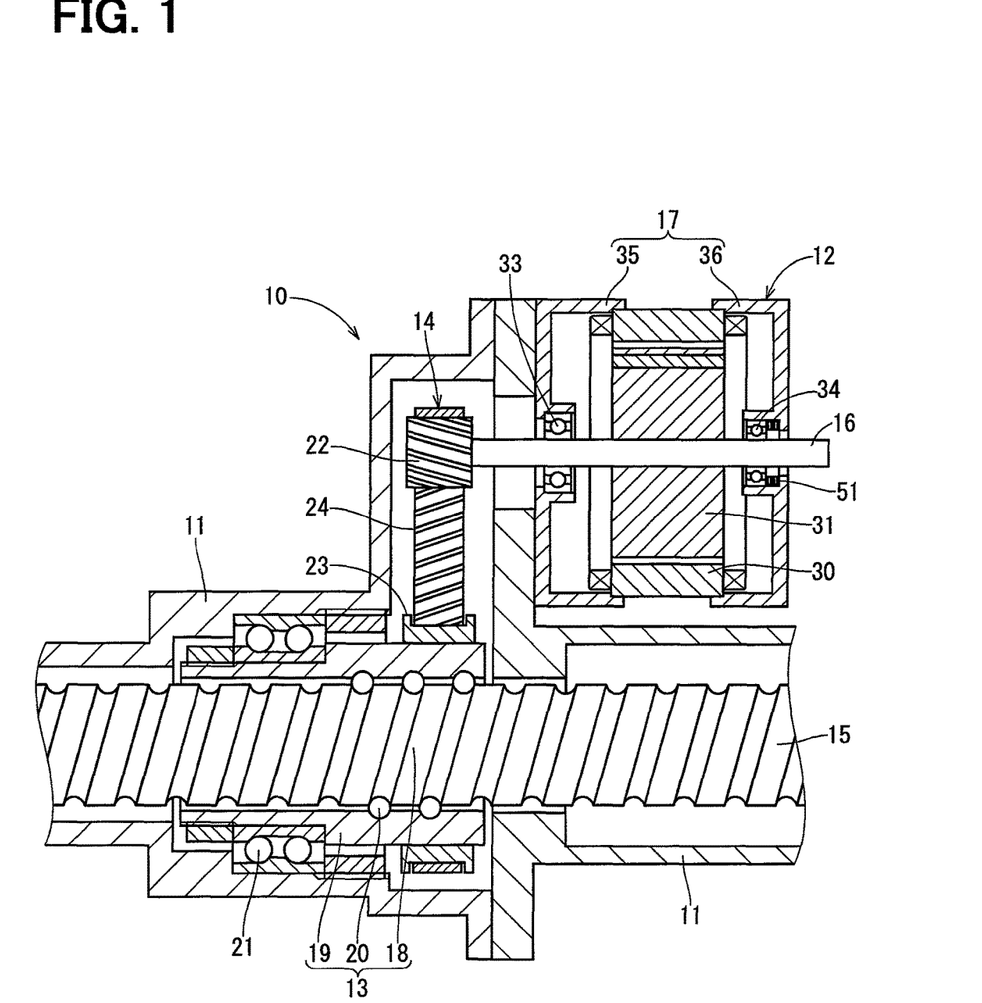
FIG. 1 is a sectional view showing an actuator motor according to an embodiment of the present disclosure and an electric power-steering device employing the actuator motor.

FIG. 1 shows an electric power-steering device employing an actuator motor according to an embodiment of the present disclosure.

(Electric Power-Steering Device)

To begin with, a configuration of the electric power-steering device 10 will be described with reference to FIG. 1. The electric power-steering device 10 has a belt-driven configuration. The electric power-steering device 10 includes a housing 11, an actuator motor 12, a ball screw 13, and a belt transmission mechanism 14.

The housing 11 accommodates a part a rack axis 15 of a steering device. The housing 11 is, for example, affixed to a vehicle body and/or the like. The actuator motor 12 is located such that the rotation axis 16 is in parallel with the rack axis 15. The actuator motor 12 includes a case 17 affixed to the housing 11.

The ball screw 13 includes a ball screw shaft portion 18, a ball nut 19, and balls 20. The ball screw shaft portion 18 is a part of the rack axis 15. The ball nut 19 is fitted to the ball screw shaft portion 18. The ball nut 19 is rotationally supported by the housing 11 via a bearing 21. The balls 20 are equipped between the ball screw shaft portion 18 and the ball nut 19. The ball screw 13 converts a rotary motion of the ball nut 19 into a linear motion of the ball screw shaft portion 18 in an axial direction.

The belt transmission mechanism 14 includes two helical toothed pulleys 22 and 23 and a helical toothed belts 24. The helical toothed pulley 22 functions as an input rotor element of a transmission mechanism. The helical toothed pulley 22 is affixed to one end of the rotation axis 16. The helical toothed pulley 23 is affixed to the ball nut 19. The helical toothed belt 24 is wound around the helical toothed pulleys 22 and 23 and is held by the helical toothed pulleys 22 and 23. The belt transmission mechanism 14 transmits rotational motion of the rotation axis 16 to the ball nut 19.

The electric power-steering device 10 configured in this way rotates the rotation axis 16 according to a steering torque, a vehicle speed, and/or the like. The rotary motion of the rotation axis 16 is converted into a linear motion of the rack axis 15 in the axial direction via the belt transmission mechanism 14 and the ball screw 13. Thus, the converted linear motion of the rack axis 15 is used to assist a steering operation of a driver. The actuator motor 12 inverts its rotational direction frequently to turn the vehicle rightward and leftward in response to an intention of a driver. The belt transmission mechanism 14 employs the helical toothed pulleys 22 and 23 and the helical toothed belt 24 in order to achieve an steering operation with less discomfort thereby to enhance a feeling of a steering operation. The belt transmission mechanism 14 is a transmission device to cause change in a load in the axial direction.

(Actuator Motor)

Figure 2:
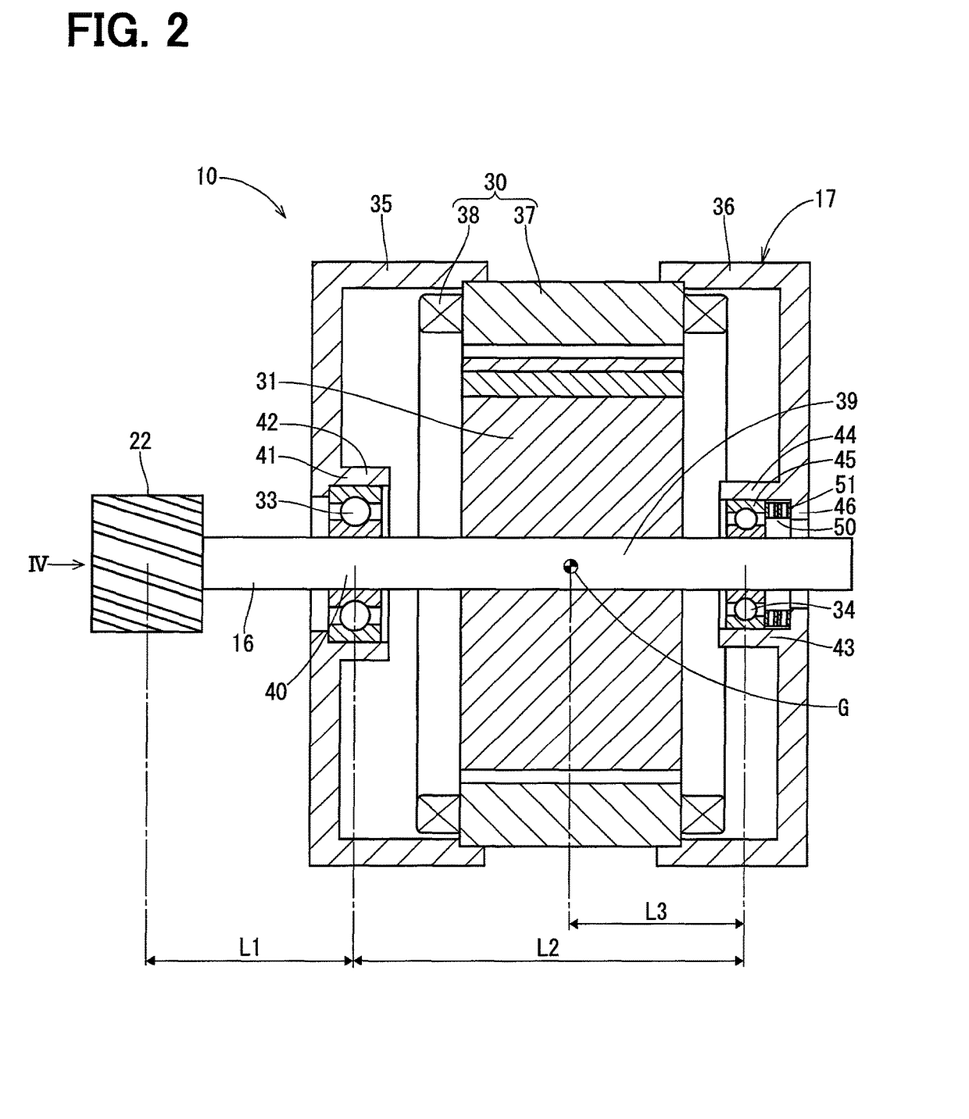
FIG. 2 is an enlarged sectional view showing the actuator motor of FIG. 1.

Subsequently, a configuration of the actuator motor 12 will be described with reference to FIGS. 2 to 5. As shown in FIG. 2, the actuator motor 12 includes the case 17, a stator 30, a rotor 31, a rotation axis 16, a first bearing 33, and a second bearing 34.

The case 17 includes a first case portion 35 and a second case portion 36, which are formed of aluminum. The first case portion 35 and the second case portion 36 are affixed to each other by using a fastener such as a bolt (not shown) in a state where the first case portion 35 and the second case portion 36 interpose the stator core 37 therebetween.

The stator 30 includes a stator core 37 and a coil 38. The coil 38 is equipped in a slot of the stator core 37. The rotor 31 is equipped inside the stator 30 and is rotational in response to a rotational magnetic field generated with the stator 30. The rotor 31 has a barycenter G located closer to the second bearing 34 than the first bearing 33.

The rotation axis 16 extends through the case 17 such that the rotation axis 16 is projected into the housing 11. The helical toothed pulley 22 is affixed to one end of the rotation axis 16. The rotation axis 16 rotates integrally with the rotor 31. The rotor 31 is fitted to a portion (first portion) 39 of the rotation axis 16. The first bearing 33 is fitted to a portion (second portion) 40 of the rotation axis 16. The portion 39 has a diameter, which is the same as a diameter of the portion 40.

The first bearing 33 is located between the helical toothed pulley 22 and the rotor 31. The first bearing 33 is held with a bearing holder 41 of the first case portion 35. The bearing holder 41 is formed in a cup shape. The first bearing 33 is fitted to a tubular portion 42 of the bearing holder 41. The first bearing 33 rotationally supports one end of the rotation axis 16.

The second bearing 34 is located on an opposite side of the rotor 31 from the first bearing 33. The second bearing 34 is held with a bearing holder 43 of the second case portion 36. The bearing holder 43 is formed in a cup shape. The second bearing 34 is fitted to a tubular portion 44 of the bearing holder 43. The second bearing 34 rotationally supports the other end of the rotation axis 16. In the present embodiment, an outer diameter of the second bearing 34 is less than an outer diameter of the first bearing 33.

An axial center of the first bearing 33 in the axial direction is at a distance L1 millimeters from a load center of the helical toothed belt 24, i.e., from a center of the helical toothed pulley 22. An axial center of the second bearing 34 in the axial direction is at a distance L2 millimeters from the axial center of the first bearing 33. A value (L2/L1) is greater than or equal to 1 and is less than or equal to 2. It is noted that, the distance L2 is required to be greater than a predetermined value in order to produce an output torque needed for the steering wheel system. It is further noted that, a belt tension is applied to the helical toothed pulley 22. The belt tension causes a motion on the second bearing 34 in an opposite direction from the application of the belt tension due to the principle of the lever centered on the first bearing 33 as the fulcrum. In a case where the distance L2 is an unnecessarily large value, the belt tension causes a large motion on the second bearing 34 in the opposite direction centered on the first bearing 33 as the fulcrum. Consequently, if the distance L2 is an unnecessarily large value, the second bearing 34 may be intensively struck against the bearing holder 43. In consideration of this factor, the value (L2/L1) may take an allowable maximum limit, which equals to 2.

An outer ring 45 of the second bearing 34 and a bottom portion 46 of the bearing holder 43 form an axial gap 50 therebetween in the axial direction. A multilayered helical wave washer 51 is equipped in the axial gap 50. The multilayered helical wave washer 51 applies a spring load onto the outer ring 45 in the axial direction.

Figure 3:
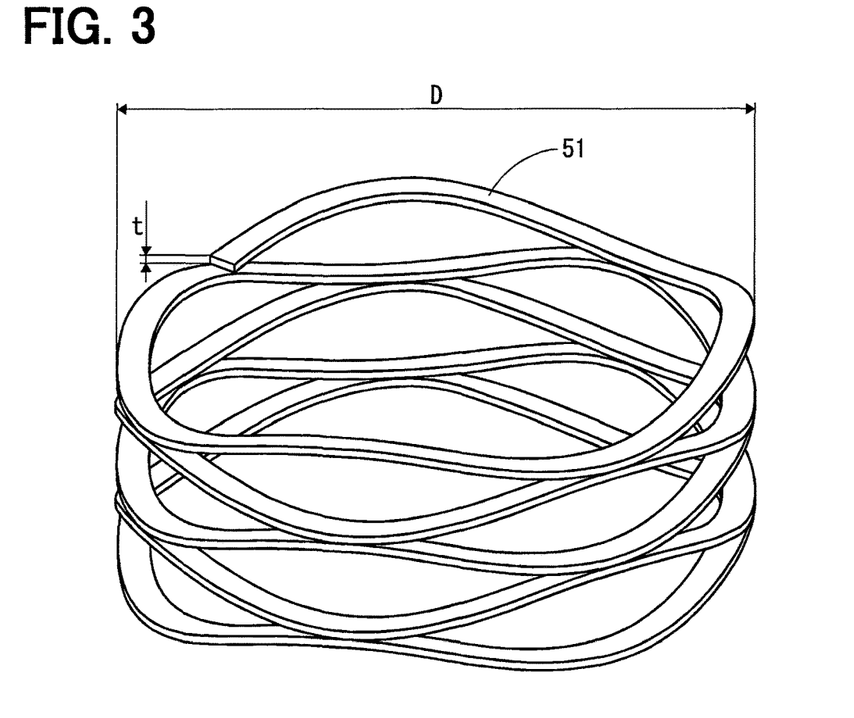
FIG. 3 is a perspective view showing a multilayered helical wave washer of the actuator motor in FIG. 2.

As shown in FIG. 3, the multilayered helical wave washer 51 is a wave washer in a spiral shape. The multilayered helical wave washer 51 is wound for three rounds or more. More specifically, the multilayered helical wave washer 51 is formed by winding a singular steel plate (rectangular wire) edgewise by three rounds or more in a spiral form. In addition, the steel plate is bent in a thickness direction to form a wave shape when being wound in the spiral form. The steel plate is bend to have, for example, four peaks (heaps) in one round. When the steel plate is bent and wound, upper peaks (heaps) and lower peaks (valleys) are inverted between an even round and an odd round adjacent to each other. That is, an upper peak in an even round and a lower peak in an odd round are opposed to each other at the same position in a winding direction. In the present embodiment, the number of turns of the multilayered helical wave washer 51 is 4.5.

Figure 4:
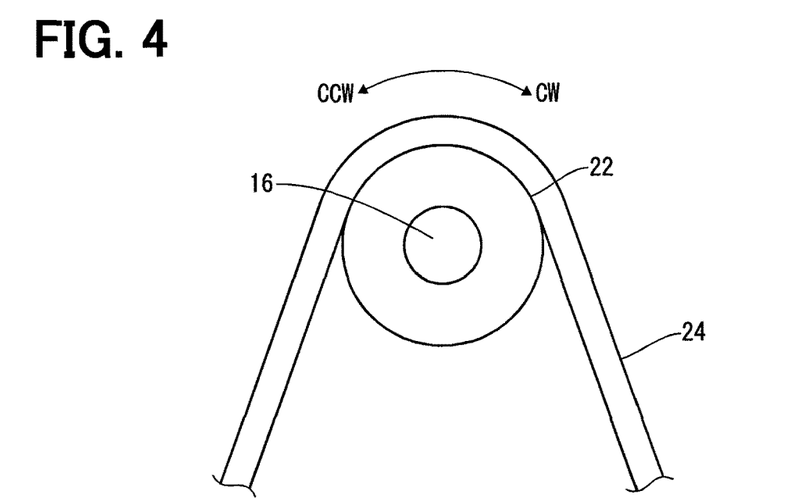
FIG. 4 is a view showing a rotation axis, a belt pulley, and a belt viewed along an arrow IV in FIG. 2.

As shown in FIG. 4, in the actuator motor 12 configured in this way, the rotation axis 16 rotates clockwise (CW) when viewed from the helical toothed pulley 22. In the present state, a counter force is applied onto the rotation axis 16 in a direction from the rotor 31 toward the second bearing 34. On receiving the counter force, the second bearing 34 moves toward the bottom portion 46 of the bearing holder 43 such that the axial gap 50 reduces. To the contrary, when the rotation axis 16 rotates counterclockwise (CCW) when viewed from the helical toothed pulley 22, a counter force is applied onto the rotation axis 16 in a direction from the rotor 31 toward the first bearing 33. On receiving the counter force, the second bearing 34 moves away from the bottom portion 46 such that the axial gap 50 expands. The multilayered helical wave washer 51 expands and contracts in the axial direction in response to the counter force. In this way, the multilayered helical wave washer 51 absorbs an impact applied to the second bearing 34 when the direction of the counter force is inverted.

Figure 5:
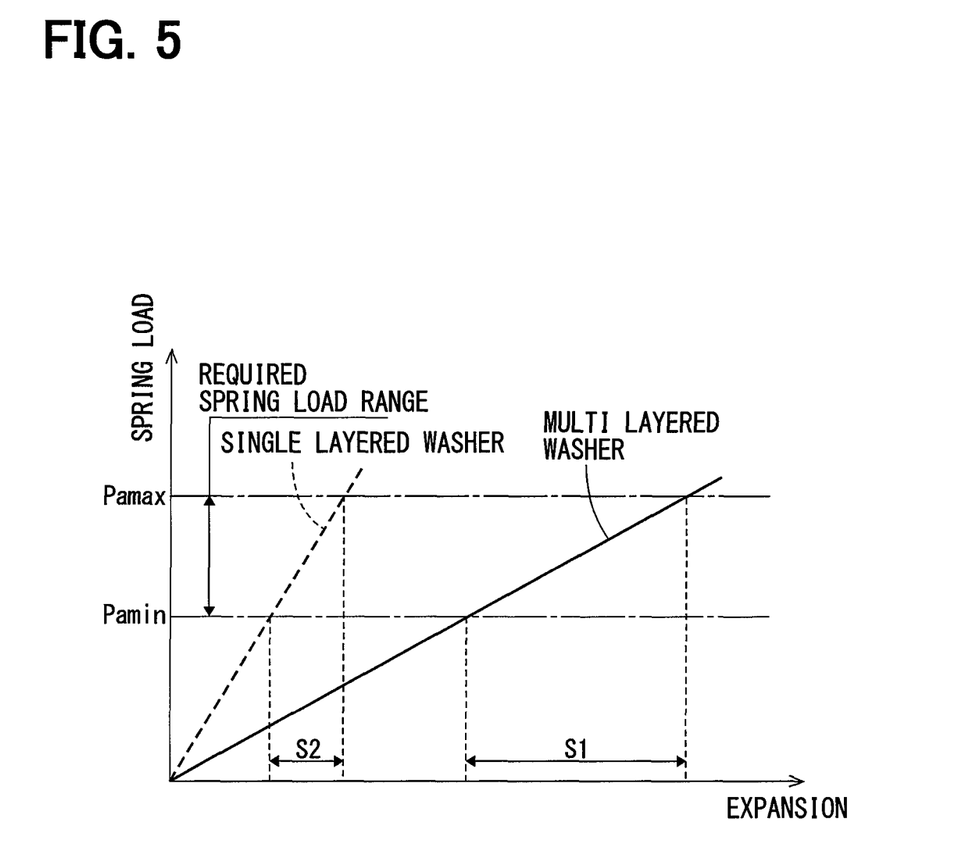
FIG. 5 is a graph showing a comparison between one relation, which is between an amount of extension and contraction of the multilayered helical wave washer of FIG. 2 and a spring load, and another relation, which is between an amount of extension and contraction of a single-layered wave washer and a spring load.

As follows, a difference between a configuration, in which the multilayered helical wave washer 51 is equipped in the axial gap 50, and a configuration, in which a single-layered wave washer is equipped in the axial gap 50, will be described with reference to FIG. 5. The second bearing 34 requires application of a spring load in a required spring load range (Pamin–Pamax). As follows, an assumable case will be described. In the assumable case, a spring constant is set to both of the wave washers to enable application of a spring load within the required spring load range to the second bearing 34, while an amount of extension and contraction changes from 0 to a maximum amount. In this case, an extension and contraction amount range S1 of the multilayered helical wave washer 51 in the required spring load range is greater than an extension and contraction amount range S2 of the single-layered wave washer in the required spring load range.

The multilayered helical wave washer 51 enables to continue to apply the spring load to the second bearing 34 in the required spring load range, even in an embodiment where the axial gap 50 changes relatively largely in the configuration including the belt pulley and the belt having the helical tooth. The multilayered helical wave washer 51 has a thickness t millimeters and an outer diameter D millimeters. In the present embodiment, a value (t/D) is greater than or equal to 0.013 and is less than or equal to 0.02. In this way, the present embodiment enables to set a suitable spring constant. To the contrary, the single-layered wave washer may not enable to apply a desired spring load when the axial gap 50 changes largely beyond the extension and contraction amount range S2.

(Effect)

As described above, according to the present embodiment, the actuator motor 12 includes the multilayered helical wave washer 51. The multilayered helical wave washer 51 is a spiral wave washer wound by three rounds or more. The multilayered helical wave washer 51 is located in the axial gap 50. The axial gap 50 is formed between the outer ring 45 of the second bearing 34 and the bottom portion 46 of the bearing holder 43 of the case 17. The multilayered helical wave washer 51 applies a spring load to the outer ring 45 in the axial direction.

The multilayered helical wave washer 51 enables to reduce its spring constant by reducing a spring load per winding. In addition, the multilayered helical wave washer 51 enables to produce a desired spring load by setting the number of windings arbitrarily. Therefore, the multilayered helical wave washer 51 enables to continue application of a relatively large spring load onto the second bearing 34 while the rotation axis 16 moves in the axial direction for a relatively large distance on receiving the counter force. Thus, the present embodiment may enable to reduce a stress in the second bearing 34 without enlargement of the device in the radial direction.

In particular, in a configuration in which the bearing holder 43 is formed of aluminum integrally with the case 17, the outer ring 45 may be hardly supported at the outer circumferential periphery, due to difference in thermal expansion between the second bearing 34 and the bearing holder 43 caused by heat generated therein and/or external heat. Under such a condition, in order to support the outer ring 45, application of the spring load may be required onto the outer ring 45 in the axial direction. In consideration of such a factor, it may be advantageous to employ the multilayered helical wave washer 51 having a large extension and contraction amount range.

In addition, according to the present embodiment, the multilayered helical wave washer 51 is equipped between the second bearing 34 and the case 17. The second bearing 34 may tend to be moved in the opposite direction from the direction, in which the belt tension is applied to the helical toothed pulley 22, due to the principle of lever centered on the first bearing 33 as the fulcrum. In this configuration, the multilayered helical wave washer 51 is equipped between the second bearing 34 and the case 17. In this way, the multilayered helical wave washer 51 applies a spring load onto the second bearing 34 thereby to reduce motion of the second bearing 34.

In addition, according to the present embodiment, the value (t/D) is greater than or equal to 0.013 and is less than or equal to 0.02. In the present configuration, the spring constant of the multilayered helical wave washer 51 is set at a suitable value such that the multilayered helical wave washer 51 is enabled to continue to apply a spring load in the required spring load range to the second bearing 34 in a configuration in which the axial gap 50 changes relatively largely.

Furthermore, in the present embodiment, the number of the upper peaks is four in one winding of the multilayered helical wave washer 51. As the number of the upper peaks increases, the height of the multilayered helical wave washer 51 per winding may be reduced. It is noted that, in a case where the number of the upper peaks is excessively large in the multilayered helical wave washer 51, a manufacturing process may become complicated, and variation in the spring load may increase due to deviation in manufacturing accuracy. Therefore, a suitable design may be to set the number of the upper peaks at four.

In addition, according to the present embodiment, the value (L2/L1) is greater than or equal to 1 and is less than or equal to 2. The distance L2 is required to be greater than a predetermined value in order to produce an output torque needed for a steering wheel system. To the contrary, a belt tension is applied to the helical toothed pulley 22. The belt tension causes the motion on the second bearing 34 in the opposite direction from the application of the belt tension due to the principle of the lever centered on the first bearing 33 as the fulcrum. In a case where the distance L2 is an unnecessarily large value, the belt tension causes a large motion on the second bearing 34 in the opposite direction centered on the first bearing 33 as the fulcrum. Consequently, the second bearing 34 may be intensively struck against the bearing holder 43. In consideration of this factor, the value (L2/L1) may be suitable to set a value greater than or equal to 1 and is less than or equal to 2.

In the present embodiment, the outer diameter of the second bearing 34 is less than the outer diameter of the first bearing 33. In a configuration, in which the outer diameter of the second bearing 34 is relatively small in this way, the multilayered helical wave washer 51 may be effective to reduce stress in the device.

The rotor 31 has the barycenter G located closer to the second bearing 34 than the first bearing 33. In the configuration, in which the barycenter G of the rotor 31 is close to the second bearing 34 (L3<L2/2) in this way, the second bearing 34 is apt to be moved away in the opposite direction from the belt tension applied to the helical toothed pulley 22 due to the principle of lever about the first bearing 33 as the fulcrum. In the configuration, the multilayered helical wave washer 51 is equipped thereby to apply a spring load to bias the second bearing 34. Thus, the configuration may reduce the motion of the second bearing 34.

(Other Embodiment)

According to another embodiment of the present disclosure, the multilayered helical wave washer may be equipped between the first bearing and the case. The multilayered helical wave washer may be equipped between the first bearings and the case, and another multilayered helical wave washer may be equipped between the second bearings and the case. According to another embodiment of the present disclosure, the barycenter of the rotor may be close to the first bearing. Alternatively, the barycenter of the rotor may be located at an intermediate point between the first bearing and the second bearing. According to another embodiment of the present disclosure, the width of the rotation axis may vary at multiple axial positions.

According to another embodiment of the present disclosure, another transmission mechanism may be employed instead of the belt transmission mechanism 14. The transmission mechanism may be configured with another device such as a pair of helical gears. According to another embodiment of the present disclosure, the mechanism, which is to convert the rotary motion of the helical toothed pulley into the linear motion of the rack axis in the axial direction, is not limited to the ball screw. The mechanism may be another mechanism, such as a gear device. The electric power-steering device is not limited to be connected with the rack axis. According to another embodiment of the present disclosure, the electric power-steering device may be connected with, for example, a steering shaft.

The actuator motor according to the present disclosure is employed for the steering device of a vehicle. The steering device is equipped with the transmission mechanism to produce change in a load in the axial direction. The actuator motor includes the case, the stator, the rotor, the first bearing, and the second bearing. The case is formed of aluminum. The stator is affixed to the case. The rotor rotates in response to the rotational magnetic field generated with the stator generates. The rotation axis is affixed with the input rotor element of the transmission mechanism at the one end. The rotation axis rotates with the rotor.

The first bearing is located between the input rotor element and the rotor. The first bearing is located in the case. The first bearing rotationally supports the rotation axis. The second bearing is located on the opposite side of the rotor from the first bearing. The second bearing is located in the case. The second bearing rotationally supports the rotation axis.

The actuator motor includes the multilayered helical wave washer. The multilayered helical wave washer is a spiral wave washer wound by three rounds or more. The multilayered helical wave washer is located in the axial gap. The axial gap is formed between the case and the outer ring of one of the first bearing and the second bearing. The multilayered helical wave washer applies a spring load to the outer ring in the axial direction.

The multilayered helical wave washer is configured to reduce its spring constant by reducing a spring load in one winding (one roll). In addition, the multilayered helical wave washer enables to generate a desired spring load by setting the number of windings arbitrarily. Therefore, the multilayered helical wave washer enables to continue application of a relatively large spring load onto the bearing while the rotation axis moves in the axial direction for a relatively large distance on receiving the counter force. Thus, the present disclosure may enable to reduce a stress in the bearing, which supports the rotation axis, without causing enlargement of the device in the radial direction.

In the present disclosure, the term of "formed of aluminum" may incorporate a product formed of an alloy (aluminum alloy), which contains aluminum as a base material (main component).

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An actuator motor for a steering device of a vehicle, the steering device including a transmission mechanism configured to produce a change in a load in an axial direction, the actuator motor comprising:

a case formed of aluminum;
a stator fixed to the case and configured to generate a rotational magnetic field;
a rotor configured to rotate according to the rotational magnetic field;
a rotary shaft having one end affixed with an input rotor element of the transmission mechanism, the rotary shaft configured to rotate with the rotor;
a first bearing disposed in the case and located between the input rotor element and the rotor along the axial direction, the first bearing supporting the rotary shaft rotatably;
a second bearing disposed in the case and located on an opposite side of the rotor from the first bearing along the axial direction, the second bearing supporting the rotary shaft rotatably; and
a helical wave washer made of a single helical wire wound at least three times, the helical wave washer located in an axial gap formed between the case and an outer ring of one of the first bearing and the second bearing, the helical wave washer configured to apply a spring load to the outer ring in the axial direction, wherein
the helical wave washer is bent in a thickness direction and is in a wave shape having a plurality of upper peaks and a plurality of lower peaks, and
the upper peaks and the lower peaks are opposed to each other and are in contact with each other at the same positions, respectively.

2. The actuator motor according to claim 1, wherein the transmission mechanism has a belt-driven configuration to transmit a rotational force to a rack axis by using a helical toothed pulley and a helical toothed belt.

3. The actuator motor according to claim 1, wherein the helical wave washer is located between the second bearing and the case.

4. The actuator motor according to claim 1, wherein the helical wave washer (51) has a thickness of t millimeters and has an outer diameter of D millimeters, and a value (t/D) is greater than or equal to 0.013 and is less than or equal to 0.02.

5. The actuator motor according to claim 1, wherein the helical wave washer has four upper peaks in one round.

6. The actuator motor according to claim 1, wherein an axial center of the first bearing and an axial center of the input rotor element are at a distance of L1 millimeters from each other,
the axial center of the first bearing and an axial center of the second bearing are at a distance of L2 millimeters from each other, and
a value (L2/L1) is greater than or equal to 1 and is less than or equal to 2.

7. The actuator motor according to claim 1, wherein the second bearing has an outer diameter, which is less than an outer diameter of the first bearing.

8. The actuator motor according to claim 1, wherein the rotor has a barycenter, which is closer to the second bearing than the first bearing.

9. The actuator motor according to claim 8, wherein the rotary shaft has a first portion and a second portion, the first portion is fitted with the rotor,
the second portion is fitted with the first bearing, and the first portion has a diameter, which is the same as a diameter of the second portion.

10. The actuator motor according to claim 1, wherein the first bearing and the second bearing face each other along the axial direction with the rotor located between the first bearing and the second bearing.

11. The actuator motor according to claim 10, wherein the rotor, the first bearing, and the second bearing are aligned coaxially.

12. The actuator motor according to claim 1, wherein all the upper peaks and all the lower peaks are opposed to each other and are in contact with each other at the same positions, respectively.

13. The actuator motor according to claim 12, wherein the plurality of upper peaks and the plurality of lower peaks are inverted between an even round and an odd round adjacent to each other, and
the upper peaks in the even round and the lower peaks in the odd round are opposed to each other at the same positions, respectively.

14. A steering device of a vehicle, the steering device comprising:
an actuator motor including
a case formed of aluminum,
a stator fixed to the case and configured to generate a rotational magnetic field,
a rotor configured to rotate according to the rotational magnetic field,
a rotary shaft configured to rotate with the rotor and having one end,
a first bearing disposed in the case and located between the one end and the rotor along the axial direction, the first bearing supporting the rotary shaft rotatably,
a second bearing disposed in the case and located on an opposite side of the rotor from the first bearing along the axial direction, the second bearing supporting the rotary shaft rotatably, and
a helical wave washer made of a single helical wire wound at least three times, the helical wave washer located in an axial gap formed between the case and an outer ring of one of the first bearing and the second bearing, the helical wave washer configured to apply a spring load to the outer ring in the axial direction; and
a transmission mechanism configured to produce a change in a load in an axial direction, the transmission mechanism including
a first helical toothed pulley fixed to the one end of the rotary shaft,
a second helical toothed pulley, and
a helical toothed belt wound around and held by the first helical toothed pulley and the second helical toothed pulley to transmit rotational motion of the rotary shaft to the second helical toothed pulley, wherein
an axial center of the first bearing and an axial center of the first helical toothed pulley are at a distance of L1 millimeters from each other,
the axial center of the first bearing and an axial center of the second bearing are at a distance of L2 millimeters from each other, and
a value (L2/L1) is greater than or equal to 1 and is less than or equal to 2.

* * * * *